(12) United States Patent
Lu et al.

(10) Patent No.: US 11,868,706 B1
(45) Date of Patent: Jan. 9, 2024

(54) SYSTEM, METHOD, AND COMPUTER PROGRAM FOR SYNCING CONTENT ACROSS WORKSPACE PAGES

(71) Applicant: Notion Labs, Inc., San Francisco, CA (US)

(72) Inventors: He Lu, San Francisco, CA (US); Simon Townsend-Last, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 17/549,565

(22) Filed: Dec. 13, 2021

(51) Int. Cl.
| | |
|---|---|
| G06F 40/166 | (2020.01) |
| G06F 40/117 | (2020.01) |
| G06F 3/0482 | (2013.01) |
| G06F 40/103 | (2020.01) |
| G06F 40/131 | (2020.01) |
| G06F 16/27 | (2019.01) |
| G06F 40/137 | (2020.01) |
| G06F 40/134 | (2020.01) |
| G06F 40/197 | (2020.01) |
| G06F 16/93 | (2019.01) |
| G06Q 10/101 | (2023.01) |

(52) U.S. Cl.
CPC .......... *G06F 40/166* (2020.01); *G06F 3/0482* (2013.01); *G06F 16/275* (2019.01); *G06F 16/93* (2019.01); *G06F 40/103* (2020.01); *G06F 40/117* (2020.01); *G06F 40/131* (2020.01); *G06F 40/134* (2020.01); *G06F 40/137* (2020.01); *G06F 40/197* (2020.01); *G06Q 10/101* (2013.01)

(58) Field of Classification Search
CPC .... G06F 40/166; G06F 3/0482; G06F 40/103; G06F 40/117; G06F 40/131; G06Q 10/101
See application file for complete search history.

(56) References Cited

U.S. PATENT DOCUMENTS

| | | | |
|---|---|---|---|
| 5,787,175 A * | 7/1998 | Carter | H04L 63/045 |
| | | | 713/180 |
| 6,558,431 B1 | 5/2003 | Lynch et al. | |
| 7,249,314 B2 * | 7/2007 | Walker | G06F 21/6227 |
| | | | 715/255 |

(Continued)

FOREIGN PATENT DOCUMENTS

WO  WO-2022184004 A1 *  9/2022

*Primary Examiner* — Benjamin Smith
(74) *Attorney, Agent, or Firm* — Lessani Law Group, PC

(57) ABSTRACT

The present disclosure describes a system, method, and computer program for syncing content across workspace pages. The system creates a first synced block on a first workspace page. Content on workspace pages rendered by the system is stored in blocks and each of the workspace pages has a hierarchy of blocks. The system adds one or more child blocks to the first synced block as content to be synced. The system creates a reference synced block on a second workspace page and adds a pointer to the reference synced block that points to the first synced block. This is done in order to sync the one or more child blocks of the first synced block across the first and second workspace pages, where editing the first synced block or the reference synced block includes editing the one or more child blocks of the first synced block.

27 Claims, 12 Drawing Sheets

(56) References Cited

U.S. PATENT DOCUMENTS

| | | | | |
|---|---|---|---|---|
| 8,434,134 B2* | 4/2013 | Khosrowshahi | ......... | G06F 16/93 726/7 |
| 9,076,128 B2* | 7/2015 | Horvitz | ............... | G06F 21/6218 |
| 9,286,271 B2* | 3/2016 | Khosrowshahi | ...... | G06F 40/134 |
| 9,449,182 B1* | 9/2016 | Dang | ................... | G06Q 10/101 |
| 10,127,944 B2* | 11/2018 | Land | ...................... | G06F 9/451 |
| 10,164,783 B2* | 12/2018 | Alexander | .............. | H04L 51/04 |
| 10,171,255 B2* | 1/2019 | Alexander | .......... | G06F 3/04842 |
| 10,257,196 B2* | 4/2019 | Dang | ................... | G06F 16/192 |
| 10,437,923 B2* | 10/2019 | Silk | ........................ | G06F 16/93 |
| 10,466,867 B2* | 11/2019 | Boucher | ................ | G06F 40/18 |
| 10,466,868 B2* | 11/2019 | Boucher | ............ | G06F 16/2228 |
| 10,521,402 B2* | 12/2019 | Nicholls | ............... | G06F 16/178 |
| 10,567,382 B2* | 2/2020 | Dang | ................... | G06Q 10/101 |
| 10,623,193 B2* | 4/2020 | Alexander | ......... | H04L 65/4038 |
| 10,970,457 B2* | 4/2021 | Prakash | ................ | G06F 40/143 |
| 11,048,666 B2* | 6/2021 | Nicholls | ............... | G06F 16/178 |
| 11,138,021 B1* | 10/2021 | Rosenstein | ............. | G09G 5/14 |
| 11,153,328 B2* | 10/2021 | Bond | ................... | G06F 21/604 |
| 11,243,824 B1* | 2/2022 | Meersma | ............... | G06F 40/166 |
| 11,423,357 B2* | 8/2022 | Didrickson | ........... | G06F 40/134 |
| 2002/0065848 A1* | 5/2002 | Walker | ................ | G06F 21/6209 715/255 |
| 2003/0229607 A1 | 12/2003 | Zellweger et al. | | |
| 2006/0129933 A1* | 6/2006 | Land | ........................ | G09G 5/00 345/473 |
| 2007/0186157 A1* | 8/2007 | Walker | ................ | G06F 21/6227 715/234 |
| 2011/0296507 A1* | 12/2011 | Khosrowshahi | ........ | G06F 16/93 715/810 |
| 2011/0314555 A1* | 12/2011 | Horvitz | ............... | G06F 21/6218 726/27 |
| 2012/0198389 A1* | 8/2012 | Audet | ................... | G06F 3/0482 715/853 |
| 2013/0246346 A1* | 9/2013 | Khosrowshahi | ...... | G06F 40/134 707/608 |
| 2015/0244538 A1* | 8/2015 | Alexander | .......... | H04L 65/4015 709/206 |
| 2015/0244748 A1* | 8/2015 | Alexander | .............. | H04L 51/04 715/758 |
| 2015/0363478 A1 | 12/2015 | Haynes | | |
| 2016/0315941 A1* | 10/2016 | Dang | .................... | G06F 16/183 |
| 2017/0012984 A1* | 1/2017 | Dang | ..................... | G06F 16/13 |
| 2017/0315683 A1* | 11/2017 | Boucher | ............... | G06F 3/0486 |
| 2017/0315979 A1* | 11/2017 | Boucher | ............ | G06F 3/04847 |
| 2018/0113862 A1* | 4/2018 | Glover | ................ | G06F 16/1873 |
| 2019/0028286 A1* | 1/2019 | Alexander | .......... | G06F 3/04842 |
| 2019/0065615 A1* | 2/2019 | Room | ................ | G06F 3/0484 |
| 2019/0138587 A1* | 5/2019 | Silk | ........................ | G06F 40/197 |
| 2019/0213243 A1* | 7/2019 | Silk | ......................... | G06F 16/27 |
| 2020/0053176 A1* | 2/2020 | Jimenez Salgado | .... | G06F 9/543 |
| 2020/0089657 A1* | 3/2020 | Nicholls | ............... | G06F 16/178 |
| 2020/0142936 A1* | 5/2020 | Kaplan | ............... | G06F 16/182 |
| 2020/0193054 A1* | 6/2020 | Bond | ................ | G06F 21/6218 |
| 2020/0265040 A1* | 8/2020 | Jung | ................... | G06F 16/9024 |
| 2021/0224464 A1* | 7/2021 | Prakash | ................ | G06F 40/103 |
| 2021/0303773 A1* | 9/2021 | Rodgers | ............... | G06F 40/103 |
| 2021/0357861 A1* | 11/2021 | Haramati | .............. | G06F 16/951 |
| 2021/0357863 A1* | 11/2021 | Cohen | .................... | G06N 20/00 |
| 2021/0382734 A1* | 12/2021 | Rosenstein | ............. | G09G 5/14 |
| 2022/0036311 A1* | 2/2022 | Didrickson | ............. | G06F 16/93 |
| 2022/0197238 A1* | 6/2022 | Kagawa | ................... | G06F 8/33 |
| 2022/0300562 A1* | 9/2022 | Jain | ...................... | G06F 40/166 |

* cited by examiner

CREATING A REFERENCE SYNCED BLOCK FROM ANOTHER SYNCED BLOCK VIA "COPY AND SYNC"

System displays a "copy and sync" menu option in association with either an original synced block or a reference synced block on a first workspace page.
310

System receives a user selection of the "copy and sync" option on the first workspace page.
320

System receives user input to paste the synced block on a second workspace page at a paste location.
330

System creates a reference synced block on the second workspace page at the paste location.
340

System adds a pointer to the reference synced block that points to the original synced block.
350

*FIG. 3*

EDITING CONTENT INSIDE A REFERENCE SYNCED BLOCK

UNSYNCING A SINGLE REFERENCE SYNCED BLOCK

System displays a menu with each reference synced block that provides a user with edit permission with an option to unsync the reference synced block.
810

System receives a user selection to unsync the reference synced block.
820

System duplicates the child block(s) in the original synced block to which the reference synced block points.
830

System replaces the reference synced block with the duplicated child block(s).
840

*FIG. 8*

UNSYNCING ALL SYNCED BLOCKS

System displays a menu with each original synced block that provides a user with edit permission with an option to unsync the original synced block and all its reference synced blocks.
910

System receives a user selection to unsync all the blocks.
920

System duplicates the child block(s) in the original synced block.
930

System replaces the original synced block and all the reference synced blocks with the duplicated child block(s).
940

*FIG. 9*

SYSTEM, METHOD, AND COMPUTER PROGRAM FOR SYNCING CONTENT ACROSS WORKSPACE PAGES

BACKGROUND OF THE INVENTION

1. Field of the Invention

This invention relates generally to computer workspaces in cloud-based software applications and, more specifically, to a system and method for syncing content across the pages of the workspace.

2. Description of the Background Art

The traditional computer workspace includes document editors, where a page is the fundamental unit. Information added to a page is stored in files and folders and locked within such a construct. For a similar piece of information to exist at a different location, it must be retyped at the new location or copied and pasted there, so that the same information is stored in two locations. Any changes to the original piece of information would have to be manually entered into the new location or manually copied and pasted to update the information. While such a model has been accepted for decades, it is also functionally limiting and inefficient within the interconnected world we live in. While some progress has been made related to the use of containers of content that can exist at different locations and be synced together, setting up such containers in a conventional system is not intuitive and requires time and many steps to accomplish. Therefore, there is a need to change the model such that information on a workspace page would be dynamic and able to stand on its own, for example, within a hierarchy of blocks, and for instances of the information to be able to exist in multiple locations and be cross-referenced bi-directionally.

SUMMARY OF THE DISCLOSURE

The present disclosure describes a system, method, and computer program for syncing content across workspace pages. The method is performed by a computer system that includes servers, storage systems, networks, operating systems, and databases.

The present invention provides a completely different paradigm for computer workspaces. It is based on a hierarchical block data model, where each piece of information in a workspace page is stored as separate objects in a database. This is different from how most text editors store information. Each block has a list of attributes including: a unique identifier, a type, a list of properties, a format, a list of child blocks, and a pointer to its parent block. One benefit of the block data model is that if a user has a piece of information that he or she wishes to present on a plurality of workspace pages (e.g., public webpages, private workspaces, etc.), the user can place instances of a block having that piece of information on the plurality of workspace pages. The plurality of workspace pages on which the user places instances of the block may be within the same workspace or in different workspaces. The present invention describes various methods for syncing the instances of the block such that a change to the piece of information on one block results in an update to the piece of information on all the synced blocks.

In one embodiment, a method for syncing content across workspace pages comprises the following steps:
creating a first synced block on a first workspace page, wherein content on workspace pages rendered by the system is stored in blocks and wherein each of the workspace pages has a hierarchy of blocks;
adding one or more child blocks to the first synced block as content to be synced;
creating a reference synced block on a second workspace page; and
adding a pointer to the reference synced block that points to the first synced block in order to sync the one or more child blocks of the first synced block across the first and second workspace pages, wherein editing the first synced block or the reference synced block comprises editing the one or more child blocks of the first synced block.

BRIEF DESCRIPTION OF THE DRAWINGS

FIG. 3 is a flowchart that illustrates a method, according to one embodiment, for creating a reference synced block from another synced block via "copy and sync."

FIG. 8 is a flowchart that illustrates a method, according to one embodiment, for unsyncing a single reference synced block.

FIG. 9 is a flowchart that illustrates a method, according to one embodiment, for unsyncing all synced blocks.

DETAILED DESCRIPTION OF THE PREFERRED EMBODIMENTS

Figure 1:
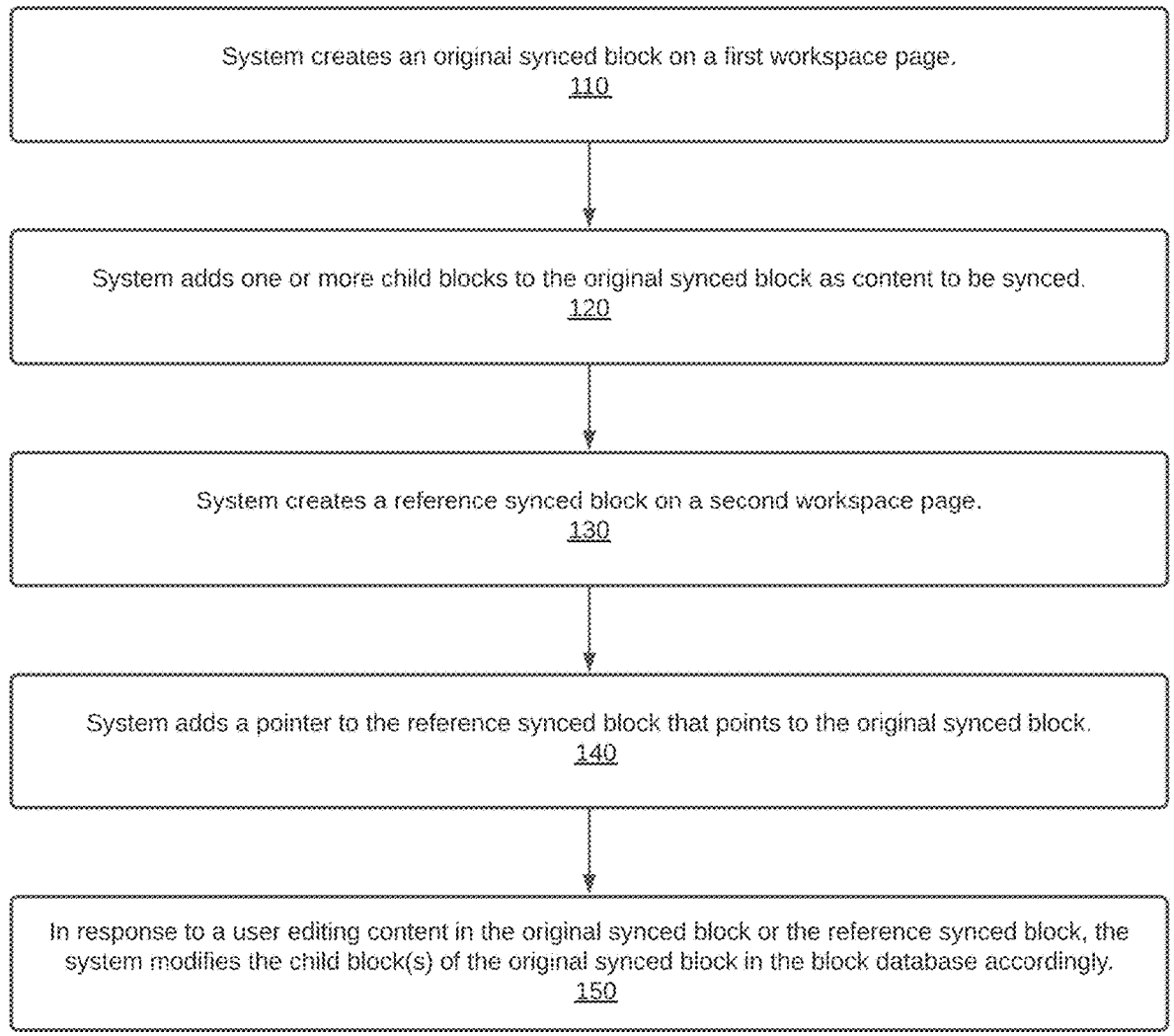
FIG. 1 is a flowchart that illustrates a method, according to one embodiment, for syncing content across workspace pages.

The present disclosure describes a system, method, and computer program for syncing content across workspace pages. The method is performed by a computer system that includes servers, storage systems, networks, operating systems, and databases ("the system").

1. Block Data Model

A block data model is comprised of one or more blocks, which are content containers. All blocks in the block data model are content blocks. The content of a block can take many forms. For example, the content can comprise text, images, lists, a row in a database, pages, or one or more child blocks. Some blocks may have one type of content, e.g., a block containing text or a block containing one or more child blocks. Some blocks may have more than one type of content, e.g., a block containing both text and one or more child blocks. Content on workspace pages (e.g., wiki pages) rendered by the system is stored in blocks and each of the workspace pages has a hierarchy of blocks (with each workspace page as the block at the top of the hierarchy).

Every block on a workspace page has attributes that describe the block itself and attributes that define the block's relationships with other blocks. For example, attributes that describe the block itself include: a unique identifier, a list of properties (e.g., a "title" property which stores the text content of blocks), and a type attribute that determines how a block is displayed. The attributes that define the block's relationships with other blocks include: an array (or ordered set) of child blocks and a pointer to its parent block.

One example of a block type is a synced block having a sync attribute. The synced block does not contain text (i.e., the text field value is empty), but rather is a container for one or more child blocks that each have their own type attribute and where a plurality of synced blocks are multiple instances of the same block at different locations. The multiple instances include an original synced block, which includes pointers to its child block(s), and one or more reference synced blocks, where the one or more reference synced blocks each has a pointer to the original synced block (or, in other words, points to the same data in the database as the original synced block), and the content of a synced block is synchronized across all references of the synced block. Other examples of block types include text, image, page, heading, callout, list (e.g., a to-do list, a numbered list, a bulleted list, etc.), toggle, a row in a database, etc. Each block is stored as a row in a database.

A user can combine blocks, move blocks between locations, and change a block's type attribute from one block type to another block type. When a user changes a block's type attribute, the block's properties and content do not change, but the type attribute changes, which, in turn, affects whether and how the properties are rendered. For example, when a block has the type "to-do list," the "checked" property of the block is rendered, but when the block is changed to a "heading" type or a "callout" type, the "checked" property of the block is not rendered.

The block's relationships with other blocks also define how the block is rendered. For example, the hierarchical relationships between a block, its array of child blocks, its parent block, and any sibling blocks form a "render tree" that renders each of the blocks in a hierarchical tree based on each block's type attribute. For example, for "list" blocks such as a "bulleted list" block and a "to-do list" block, the text content of the child block(s) is indented below the text content of the block itself. For a "toggle list" block, the text content of the child block(s) is also indented below the text content of the block itself, but the child block(s) is only rendered when the toggle property is expanded; otherwise, only the text content of the block itself is rendered. For a "page" block, the content of the block is displayed in a new page rather than indented on the current page.

Editing the hierarchical tree is also based on the relationships between the blocks. For example, unlike a conventional workspace, indenting a block does not just change the style properties of the blocks, but it also changes the hierarchical structure of the tree such that the indented block is added as a child block to the nearest preceding sibling block.

The hierarchical relationships between the blocks also determine which users have permission to view or edit which blocks. A block inherits the permissions of its parent block. Hence, the attribute of a block that is a pointer to its parent block determines the permissions of the block. In other words, as the permissions are traced through the hierarchy, the workspace page block as the block at the top of the hierarchy ultimately determines the permissions for the entire workspace page.

Example implementations of the methods are described in more detail with respect to FIGS. 1-11B.

2. Method for Syncing Content Across Workspace Pages

FIG. 1 illustrates a method for syncing content across workspace pages. The system creates an original synced block on a first workspace page (step 110). The system adds one or more child blocks to the original synced block as content to be synced (step 120). The content is not yet synced with anything as no reference synced block has been created. The child block(s) are of different block types than the synced block. For example, a child block can be of block type "to-do list." The system creates a reference synced block on a second workspace page (step 130). The system adds a pointer to the reference synced block that points to the original synced block (step 140). This is done in order to sync the one or more child blocks of the original synced block across the first and second workspace pages. In response to a user editing content in the original synced block or the reference synced block, the system modifies the child block(s) of the original synced block in the block database accordingly (step 150).

In certain embodiments, the first workspace page and the second workspace page are within the same workspace. In certain embodiments, the first workspace page and the second workspace page are in different workspaces.

In certain embodiments, in response to receiving user input to insert the synced content in one or more additional workspace pages, the system creates an additional reference synced block for each of the additional workspace pages and adds a pointer that points to the original synced block to each of the additional reference synced blocks.

Figure 2:
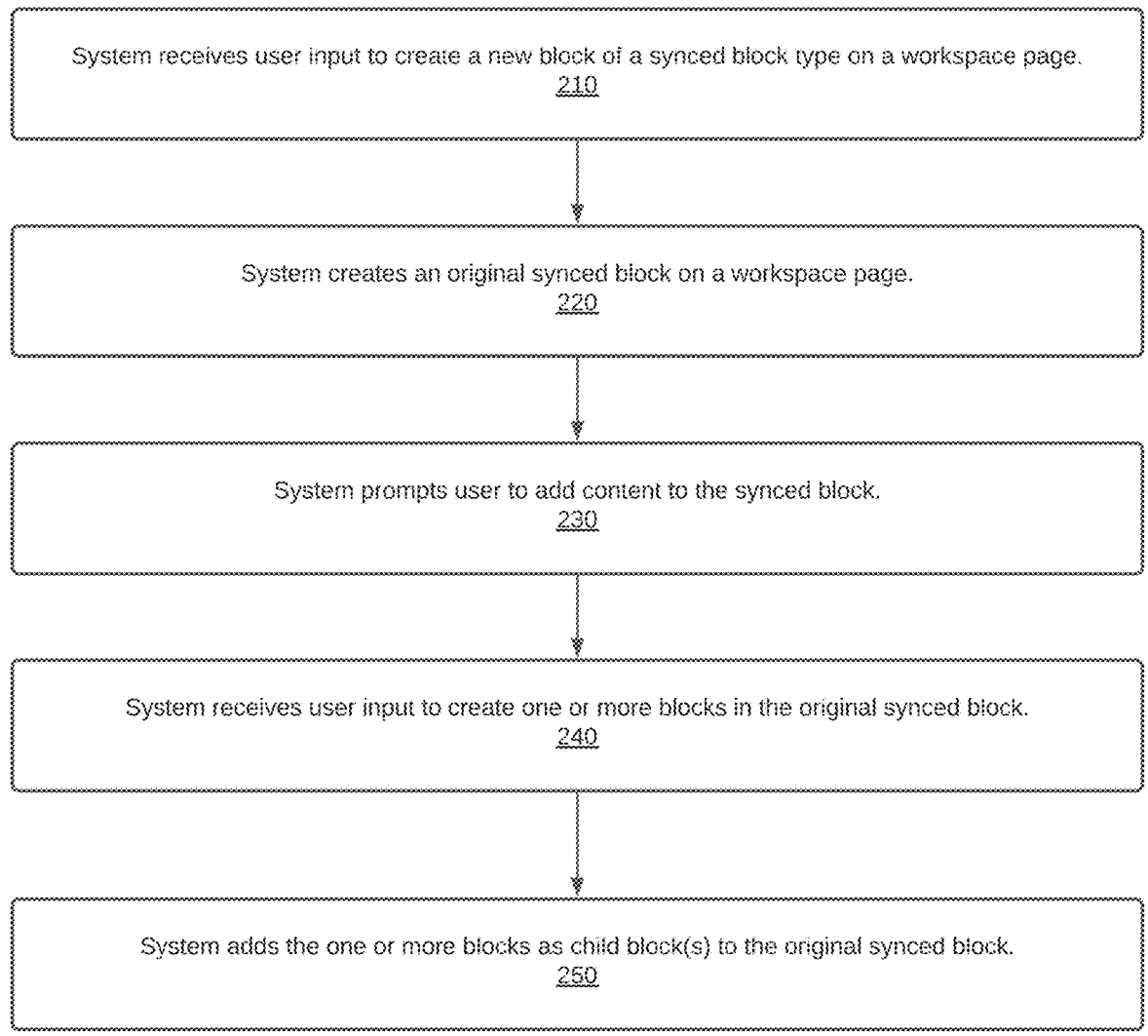
FIG. 2 is a flowchart that illustrates a method, according to one embodiment, for creating an original synced block by creating an empty block of synced block type.

3. Method for Creating an Original Synced Block by Creating an Empty Block of a Synced Block Type FIG. 2 illustrates a method for creating an original synced block by creating an empty block of a synced block type. The system receives user input to create a new block of a synced block type on a workspace page (step 210), for example, by the user adding a block of a synced block type to the workspace page. The system creates an original synced block on a workspace page (step 220). The system prompts the user to add content to the synced block (step 230). The system receives user input to create one or more blocks in the original synced block (step 240). The system adds the one or more blocks as child block(s) to the original synced block (step 250).

4. Method for Creating a Reference Synced Block from Another Synced Block Via "Copy and Sync"

FIG. 3 illustrates a method for creating a reference synced block from another synced block via "copy and sync." The system displays a "copy and sync" menu option in association with either an original synced block or a reference synced block on a first workspace page (step 310). The system receives a user selection of the "copy and sync" option on the first workspace page (step 320). The system receives user input to paste the synced block on a second workspace page at a paste location (step 330). The system creates a reference synced block on the second workspace page at the paste location (step 340). The system adds a pointer to the reference synced block that points to the original synced block (step 350).

In certain embodiments, if the user selects the "copy and sync" option from a first reference synced block, then when the user pastes the block on another workspace page, the user is creating a second reference synced block that points to the same original synced block as pointed to by the first reference synced block.

5. Method for Creating Both an Original Synced Block and a Reference Synced Block Via "Paste and Sync"

Figure 4:
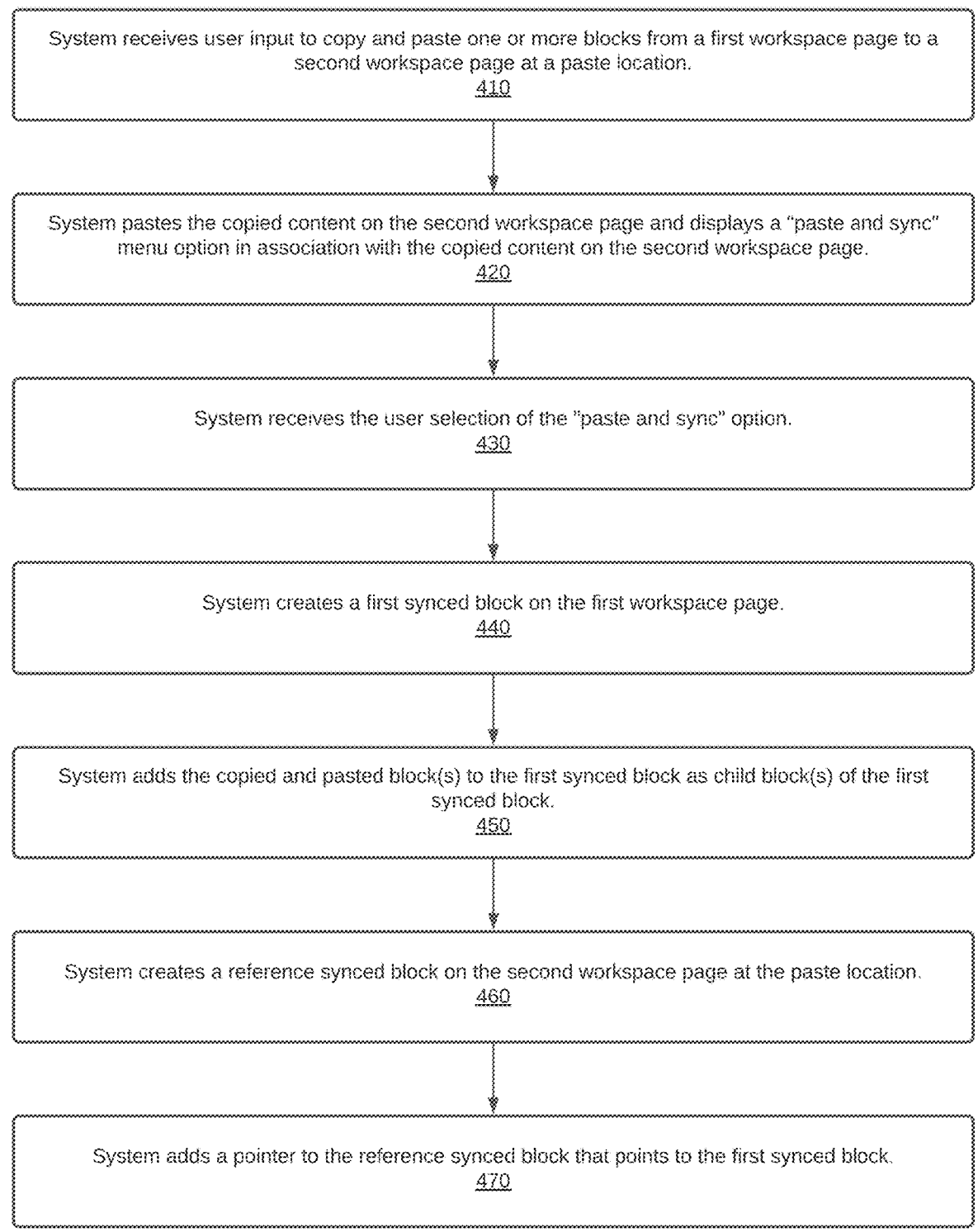
FIG. 4 is a flowchart that illustrates a method, according to one embodiment, for creating both an original synced block and a reference synced block via "paste and sync."

FIG. 4 illustrates a method for creating both an original synced block and a reference synced block via "paste and sync." The system receives user input to copy and paste one or more blocks from a first workspace page to a second workspace page at a paste location (step 410). The system pastes the copied content on the second workspace page and displays a "paste and sync" menu option in association with the copied content on the second workspace page (step 420). The system receives the user selection of the "paste and sync" option (step 430). The system creates a first synced block on the first workspace page (step 440). The system adds the copied and pasted block(s) to the first synced block as child block(s) of the first synced block (step 450). The system creates a reference synced block on the second workspace page at the paste location (step 460). The system adds a pointer to the reference synced block that points to the first synced block (step 470).

6. Method for Identifying Permission Mismatches

Figure 5:
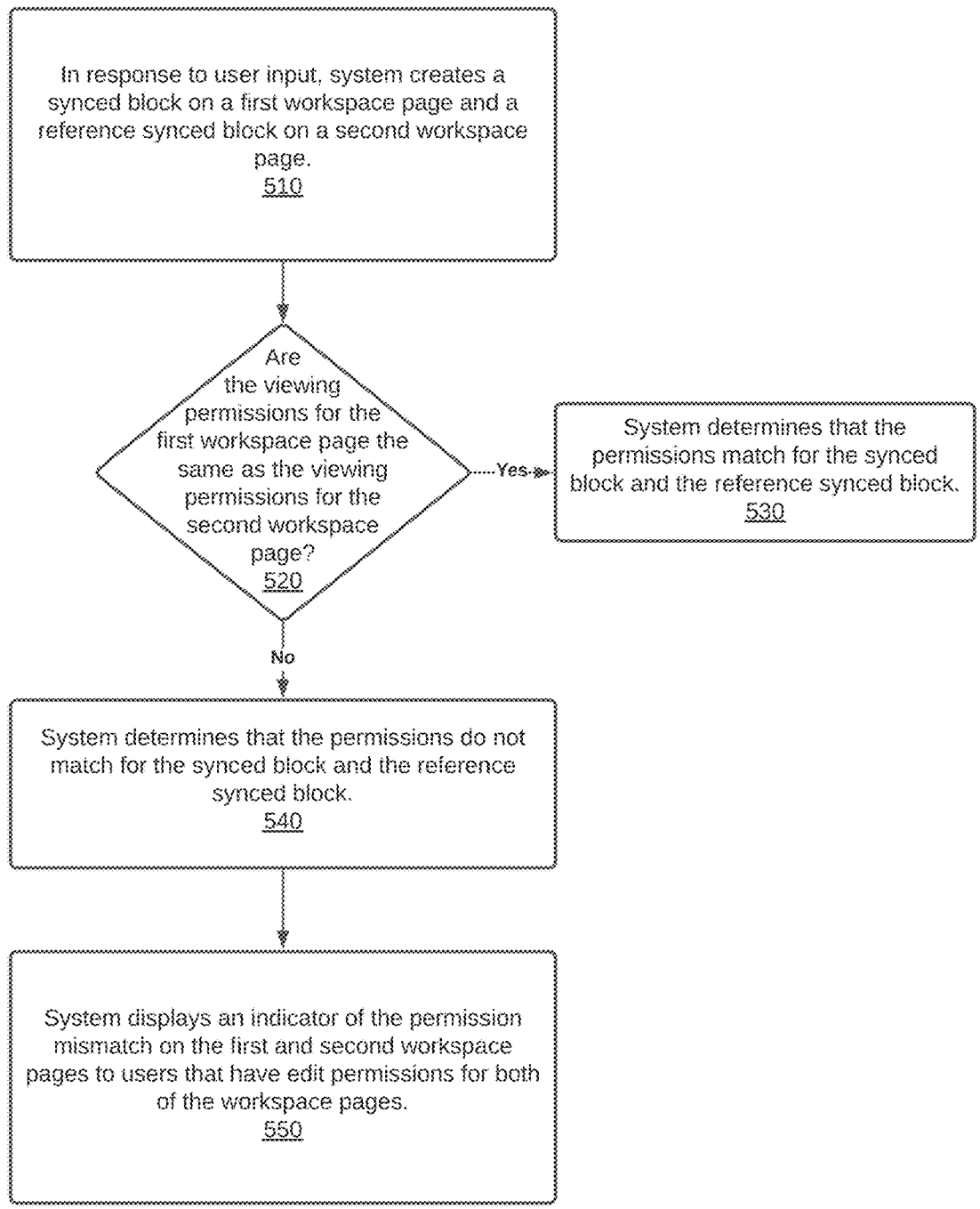
FIG. 5 is a flowchart that illustrates a method, according to one embodiment, for identifying permission mismatches.

FIG. 5 illustrates a method for identifying permission mismatches between a first workspace page with a synced block and a second workspace page with a reference synced block. Permissions are set at the workspace page level and can include access rights to the content such as read only, can add comments, can edit content, full access (i.e., user can edit content and change permission settings), and public. In response to user input, the system creates a synced block on a first workspace page and a reference synced block on a second workspace page (step 510). The system determines whether the viewing permissions for the first workspace page are the same as the viewing permissions for the second workspace page (step 520). In other words, determining whether the viewing permissions are the same means that the system determines whether all users having permission to view the second workspace page also have permission to view the first workspace page. As described in Section 1 above, a block inherits the permissions of its parent block. Therefore, based on the hierarchy, the workspace page block ultimately determines the permissions of all the blocks on the workspace page. Each reference synced block inherits the permissions of the workspace page on which the original synced block was created.

If the viewing permissions are the same, the system determines that the permissions match for the synced block and the reference synced block (step 530) and renders the reference synced block on the second workspace page. If the viewing permissions are not the same (i.e., determining that at least one user having permission to view the second workspace page does not have permission to view the first workspace page), the system determines that the permissions do not match for the synced block and the reference synced block (step 540), renders the reference synced block in the second workspace page only for users having viewing permission, and displays an indicator of the permission mismatch on the first and second workspace pages to users that have edit permissions for both of the workspace pages (step 550). In certain embodiments, the indicator of the permission mismatch is only displayed on the first workspace page, or only on the second workspace page.

7. Method for Rendering a Workspace Page with a Reference Synced Block

Figure 6:
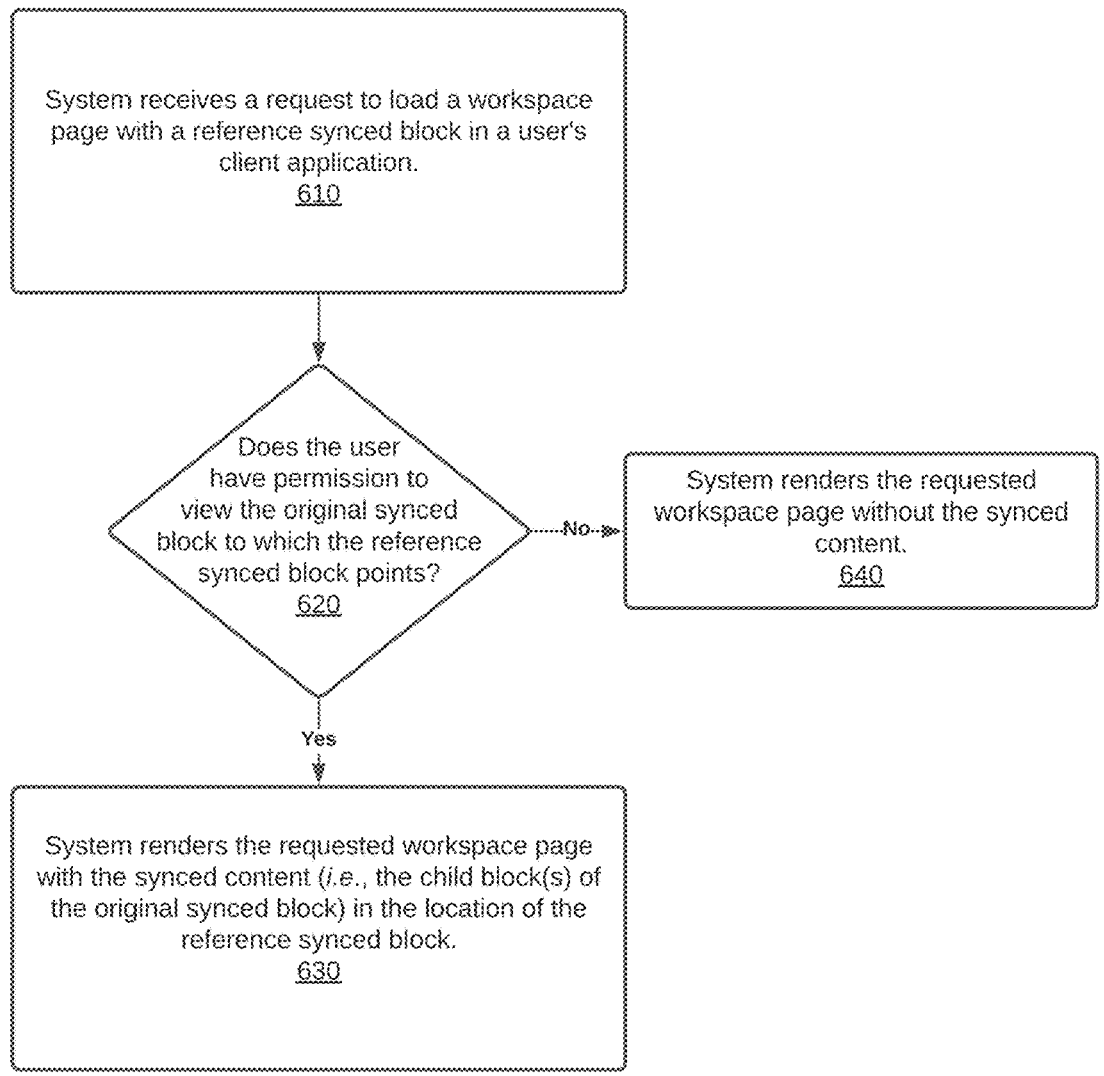
FIG. 6 is a flowchart that illustrates a method, according to one embodiment, for rendering a workspace page with a reference synced block.

FIG. 6 illustrates a method for rendering a workspace page with a reference synced block. The system receives a request to load a workspace page with a reference synced block in a user's client application (step 610). The system determines whether the user has permission to view the original synced block to which the reference synced block points (step 620). If the user has permission to view the original synced block, the system renders the requested workspace page with the synced content (i.e., the child block(s) of the original synced block) in the location of the reference synced block (step 630). If the user does not have permission to view the original synced block, the system renders the requested workspace page without the synced content (i.e., the child block(s) of the original synced block) (step 640).

In certain embodiments, the original synced block and each reference synced block are each associated with a display that lists all the workspace pages on which the synced content appears. In certain embodiments, in response to a user selecting a workspace page on a list, the system navigates the user to the selected workspace page.

8. Method for Editing Content Inside a Reference Synced Block

Figure 7:
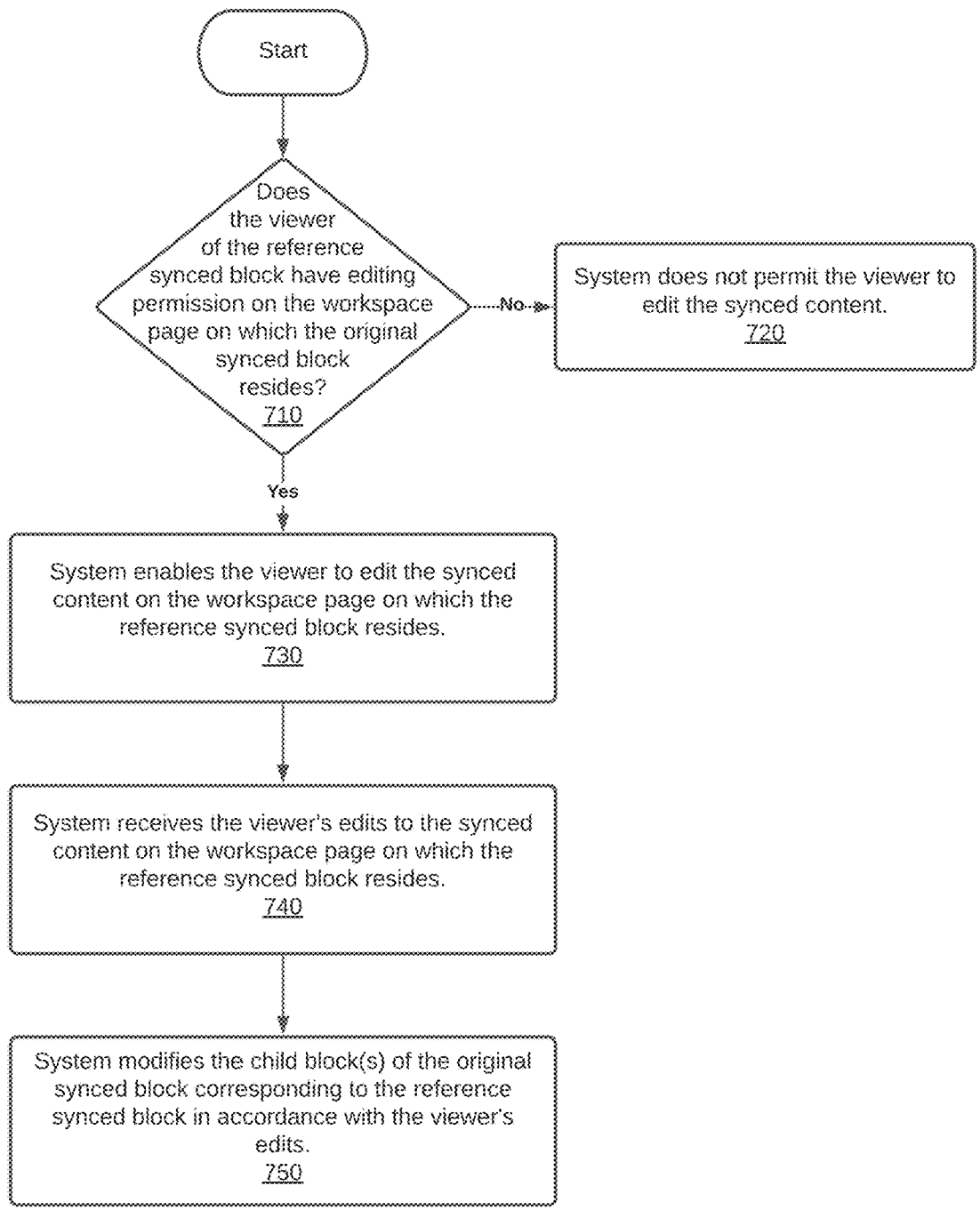
FIG. 7 is a flowchart that illustrates a method, according to one embodiment, for editing content inside a reference synced block.

FIG. 7 illustrates a method for editing content inside a reference synced block. The system determines whether the viewer of the reference synced block has editing permission on the workspace page on which the original synced block resides (step 710). If the viewer does not have editing permission, the system does not permit the viewer to edit the synced content (step 720). If, however, the viewer does have editing permission, the system enables the viewer to edit the synced content on the workspace page on which the reference synced block resides (step 730). The system receives the viewer's edits to the synced content on the workspace page on which the reference synced block resides (step 740). The system modifies the child block(s) of the original synced block corresponding to the reference synced block in accordance with the viewer's edits (step 750).

9. Method for Unsyncing a Single Reference Synced Block

FIG. 8 illustrates a method for unsyncing a single reference synced block. The system displays a menu with each reference synced block that provides a user with edit permission with an option to unsync the reference synced block (step 810). The system receives a user selection to unsync the reference synced block (step 820). The system duplicates the child block(s) in the original synced block to which the reference synced block points (step 830). The system replaces the reference synced block with the duplicated child block(s) (step 840).

10. Method for Unsyncing all Synced Blocks

FIG. 9 illustrates a method for unsyncing all synced blocks. The system displays a menu with each original synced block that provides a user with edit permission with an option to unsync the original synced block and all its reference synced blocks (step 910). The system receives a user selection to unsync all the blocks (step 920). The system duplicates the child block(s) in the original synced block (step 930). The system replaces the original synced block and all the reference synced blocks with the duplicated child block(s) (step 940).

11. Example System Architecture

Figure 10:
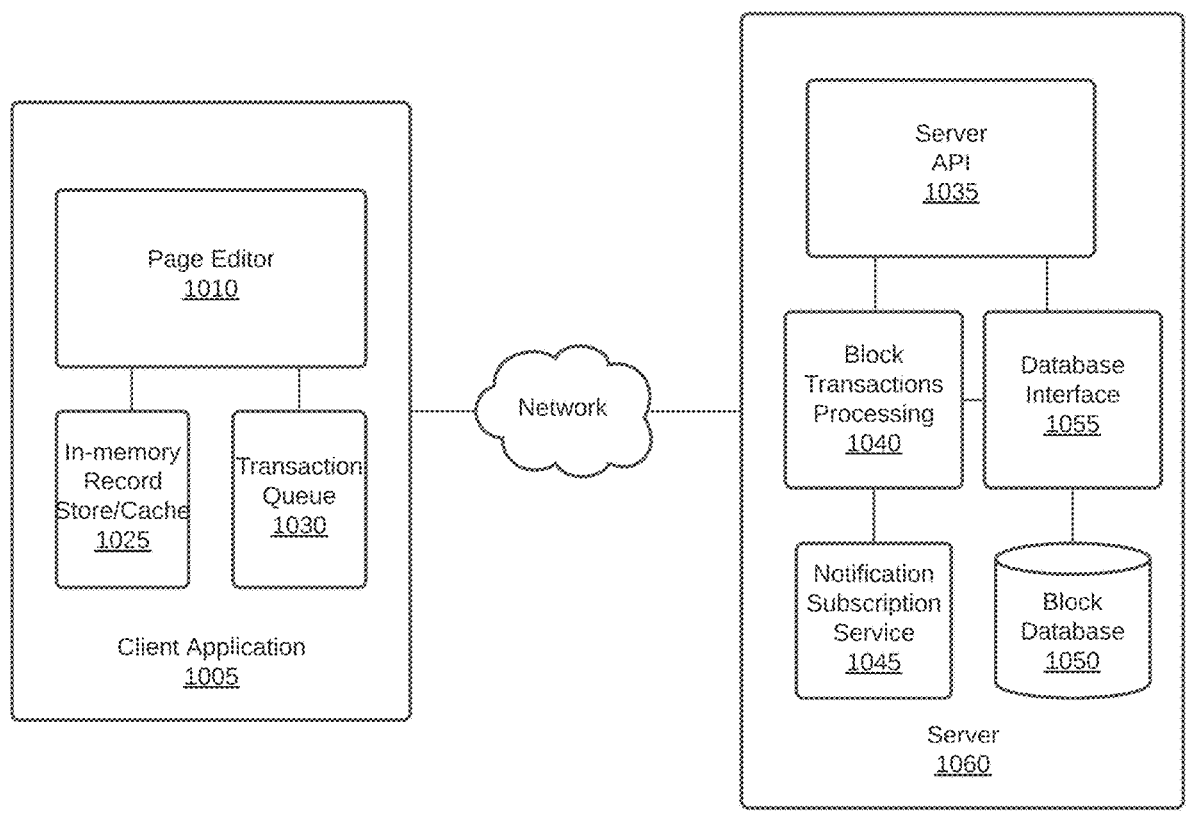
FIG. 10 is a block diagram that illustrates an example system architecture according to one embodiment.

FIG. 10 illustrates an example architecture for a system that performs the methods described herein. However, the methods described herein may be implemented in other systems and are not limited to the illustrated system.

In FIG. 10, a client application 1005 is connected to a server 1060 via a network. The client application 1005 includes a page editor 1010, an in-memory record store/cache 1025, and a transaction queue 1030. The page editor 1010 enables the creation, copying, pasting, editing, deleting, syncing, and unsyncing of blocks. The in-memory record store/cache 1025 temporarily stores block data for blocks rendered by the client application 1005, including changes made in the client application 1005. The transaction queue 1030 groups changes to blocks (e.g., creations, edits, and deletions) into transactions, and sends the transactions to the server 1060.

The server includes a server application programming interface (API) 1035, a block transactions processing module 1040, a notification subscription service module 1045, a block database 1050, and a database interface 1055. The server API 1035 sends block data to and receives block data from the client application 1005. When a client application 1005 requests a workspace page, the server API 1035 receives the request, the database interface 1055 retrieves block data for the requested page from the block database 1050, and the block data is sent to the client application 1005 via the server API 1035. Transactions from the client application 1005 are received at the server API 1035 and sent to the block transaction processing module 1040. The block transaction processing module 1040 processes transactions from client application 1005 and saves valid block changes to the block database 1050 via the database interface 1055. The notification subscription service module 1045 notifies client application 1005 of changes to blocks to which they subscribe. Client application 1005 subscribes to notifications for blocks currently rendered in the client application 1005.

12. Example Screenshots of User Interface Visualization

Figure 11A:
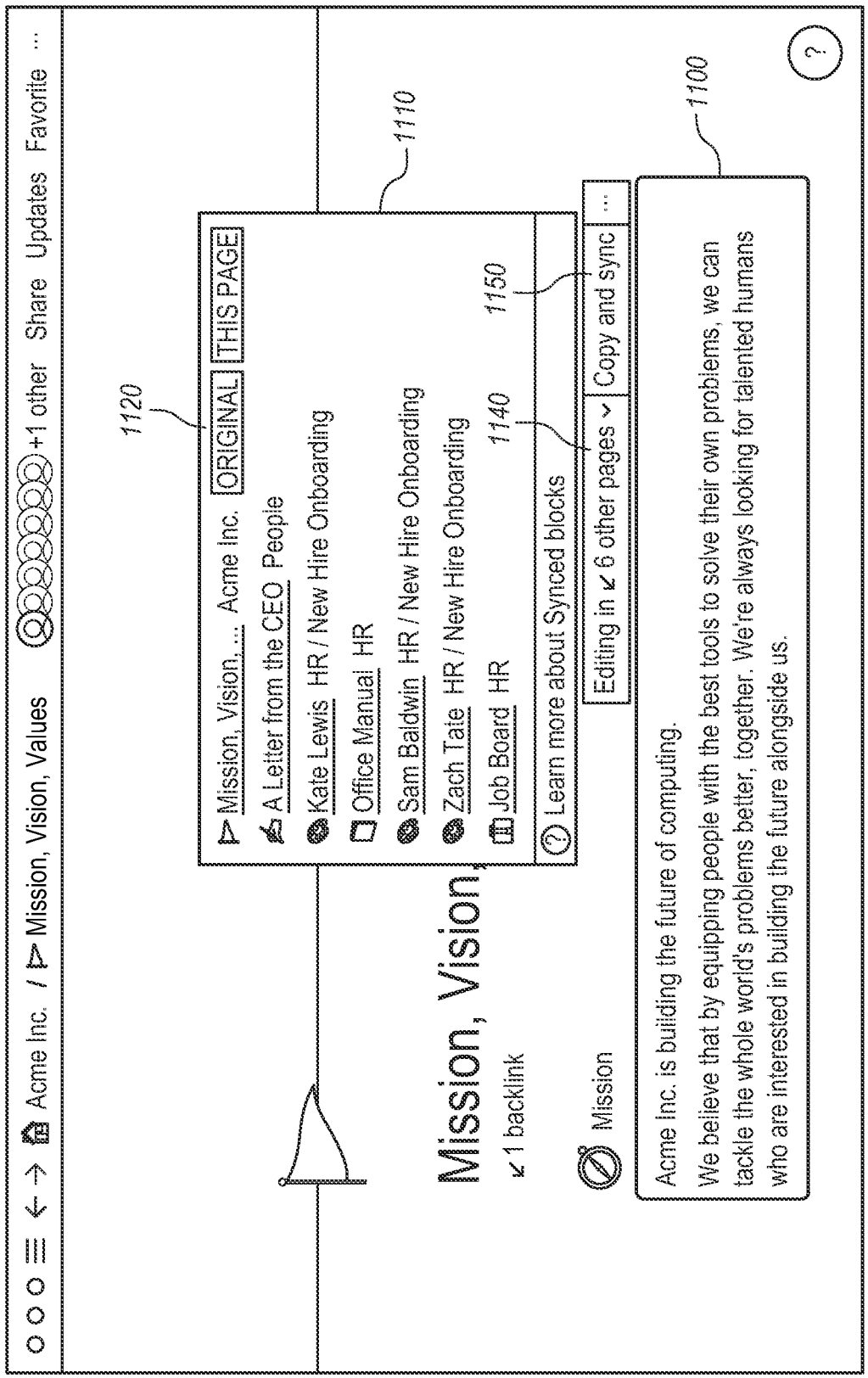
FIGS. 11A-11B are screenshots of an exemplary user interface visualization according to one embodiment of the invention.
Figure 11B:
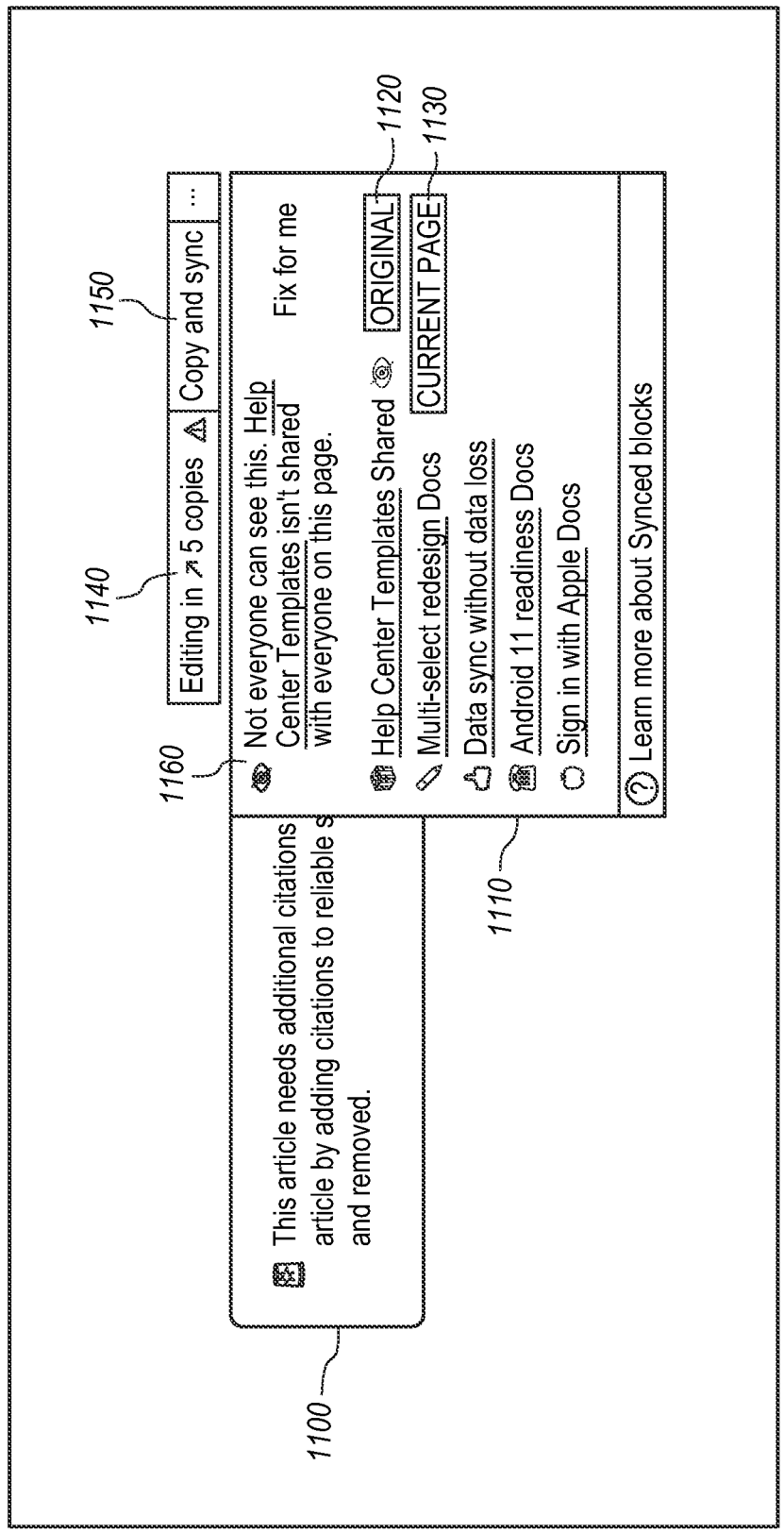

FIGS. 11A-11B illustrate screenshots of an exemplary user interface visualization according to the present invention. A person skilled in the art would understand that the present invention may be embodied in other user interface visualizations having more or less functionality within the scope of the present invention. As such, FIGS. 11A-11B are intended to be illustrative and not limiting in any way.

In the user interface visualization of FIGS. 11A-11B, the system provides a visual indicator of a synced block (e.g., a red ring) 1100. The system tracks the locations of all instances of a synced block and knows which of the instances is the original synced block. The user interface visualization provides a view of all the locations (i.e., the workspace pages) that have an instance of the synced block to which the user has access 1110. The user can navigate to any other instance of a synced block by clicking on the location. The workspace page that is the original synced block is labeled as "original" 1120. The workspace page with the current instance is labeled as "current" 1130. The user interface visualization also shows when another instance is being edited (e.g., by another user in the system) 1140. As described in Section 4 above, the user interface visualization includes a "copy and sync" option 1150 enabling the user to efficiently create a reference synced block on another workspace page that is synced with the original synced block. Unlike FIG. 11A, FIG. 11B has a permission mismatch such that not everyone who has access to the current synced block also has access to the original synced block. As such, an indicator 1160 is displayed to notify a user who has edit permissions for the current page of the permission mismatch. In certain embodiments, a user with "read-only" access has a user interface visualization in which all edit elements are disabled. In certain embodiments, a user can delete just one instance of a synced block. In certain embodiments, a user can delete all instances of a synced block.

13. General

The methods described with respect to FIGS. 1-11B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for syncing content across workspace pages, the method comprising:
   creating a first synced block on a first workspace page, wherein content on workspace pages rendered by the system is stored in blocks, wherein each of the workspace pages has a hierarchy of blocks, wherein each block has 1) attributes that describe the block itself including a unique identifier, a list of properties, and a type attribute that determines how the block is displayed and 2) attributes that define the block's relationships with other blocks including an array of child blocks and a pointer to its parent block, and wherein, in response to a user changing a block's type attribute from a first block type to a second block type, changing how the block is rendered from a first rendering to a second rendering, including whether or not to render one or more properties of the block and whether or not to indent content of the block;
   adding one or more child blocks to the first synced block as content to be synced;
   creating a reference synced block on a second workspace page; and
   adding a pointer to the reference synced block that points to the first synced block in order to sync the one or more child blocks of the first synced block across the first and second workspace pages, wherein editing the first synced block or the reference synced block comprises editing the one or more child blocks of the first synced block.

2. The method of claim 1, wherein the first workspace page and the second workspace page are in different workspaces.

3. The method of claim 1, further comprising:
   determining whether all users having permission to view the second workspace page also have permission to view the first workspace page; and
   in response to determining that at least one user having permission to view the second workspace page does not have permission to view the first workspace page, displaying an indicator on the first workspace page to a user having permission to edit the first workspace page that there is a permission mismatch with the first synced block and the reference synced block.

4. The method of claim 1, wherein rendering the second workspace page comprises:
- determining whether a user for whom the second workspace page is being rendered has permission to view the first workspace page;
- in response to determining that the user has permission, displaying the one or more child blocks of the first synced block in the second workspace page at the location of the reference synced block on the second workspace page; and
- in response to determining that the user does not have permission, rendering the second workspace page without the child block(s) of the first synced block.

5. The method of claim 1, wherein, in response to receiving user input to insert the synced content in one or more additional workspace pages, creating an additional reference synced block for each of the additional workspace pages and adding a pointer that points to the first synced block to each of the additional reference synced blocks.

6. The method of claim 5, wherein the first synced block and each reference synced block are each associated with a display that lists all the workspace pages on which the synced content appears.

7. The method of claim 6, wherein in response to a user selecting a workspace page on a list, navigating the user to the selected workspace page.

8. The method of claim 5, further comprising:
- displaying a menu in association with each of the reference synced blocks that provides a user with an option to unsync the reference synced block; and
- in response to receiving a user selection of the option, performing the following:
  - duplicating the child block(s) in the first synced block, and
  - replacing the reference synced block with the duplicated child block(s).

9. The method of claim 5, further comprising:
- displaying a menu in association with the first synced block that provides a user with an option to unsync all the reference synced blocks; and
- in response to selecting the option, performing the following:
  - duplicating the child block(s) in the first synced block, and
  - replacing the first synced block and all the reference synced blocks with the duplicated child block(s).

10. The method of claim 1, wherein the first synced block is created in response to a user adding a block of a synced block type.

11. The method of claim 1, wherein creating the reference synced block comprises:
- displaying a menu in association with the first synced block that includes a copy and sync option;
- receiving a user selection of the copy and sync option;
- receiving user input to paste the first synced block on the second workspace page at a paste location; and
- creating the reference synced block at the paste location on the second workspace page.

12. The method of claim 1, wherein creating the first synced block and the reference synced block comprises:
- receiving user input to copy and paste one or more blocks from the first workspace page to the second workspace page at a paste location;
- providing the user with a paste and sync option on the second workspace page; and
- in response to the user selecting the paste and sync option, creating the first synced block on the first workspace page, adding the copied and pasted block(s) as child block(s) to the first synced block, and creating the reference synced block on the second workspace page at the paste location.

13. The method of claim 1, wherein a synced block does not contain text, but is a container for one or more child blocks that each have their own attributes, and wherein a plurality of synced blocks are multiple instances of the same block at different locations.

14. A computer system for syncing content across workspace pages, the system comprising:
- one or more processors;
- one or more memory units coupled to the one or more processors, wherein the one or more memory units store instructions that, when executed by the one or more processors, cause the system to perform the operations of:
  - creating a first synced block on a first workspace page, wherein content on workspace pages rendered by the system is stored in blocks, wherein each of the workspace pages has a hierarchy of blocks, wherein each block has 1) attributes that describe the block itself including a unique identifier, a list of properties, and a type attribute that determines how the block is displayed and 2) attributes that define the block's relationships with other blocks including an array of child blocks and a pointer to its parent block, and wherein, in response to a user changing a block's type attribute from a first block type to a second block type, changing how the block is rendered from a first rendering to a second rendering, including whether or not to render one or more properties of the block and whether or not to indent content of the block;
  - adding one or more child blocks to the first synced block as content to be synced;
  - creating a reference synced block on a second workspace page; and
  - adding a pointer to the reference synced block that points to the first synced block in order to sync the one or more child blocks of the first synced block across the first and second workspace pages, wherein editing the first synced block or the reference synced block comprises editing the one or more child blocks of the first synced block.

15. A non-transitory computer-readable medium comprising a computer program, that, when executed by a computer system, enables the computer system to perform the following method for syncing content across workspace pages, the method comprising:
- creating a first synced block on a first workspace page, wherein content on workspace pages rendered by the system is stored in blocks, wherein each of the workspace pages has a hierarchy of blocks, wherein each block has 1) attributes that describe the block itself including a unique identifier, a list of properties, and a type attribute that determines how the block is displayed and 2) attributes that define the block's relationships with other blocks including an array of child blocks and a pointer to its parent block, and wherein, in response to a user changing a block's type attribute from a first block type to a second block type, changing how the block is rendered from a first rendering to a second rendering, including whether or not to render one or more properties of the block and whether or not to indent content of the block;

adding one or more child blocks to the first synced block as content to be synced;

creating a reference synced block on a second workspace page; and adding a pointer to the reference synced block that points to the first synced block in order to sync the one or more child blocks of the first synced block across the first and second workspace pages, wherein editing the first synced block or the reference synced block comprises editing the one or more child blocks of the first synced block.

16. The non-transitory computer-readable medium of claim 15, wherein the first workspace page and the second workspace page are in different workspaces.

17. The non-transitory computer-readable medium of claim 15, further comprising:
determining whether all users having permission to view the second workspace page also have permission to view the first workspace page; and
in response to determining that at least one user having permission to view the second workspace page does not have permission to view the first workspace page, displaying an indicator on the first workspace page to a user having permission to edit the first workspace page that there is a permission mismatch with the first synced block and the reference synced block.

18. The non-transitory computer-readable medium of claim 15, wherein rendering the second workspace page comprises:
determining whether a user for whom the second workspace page is being rendered has permission to view the first workspace page;
in response to determining that the user has permission, displaying the one or more child blocks of the first synced block in the second workspace page at the location of the reference synced block on the second workspace page; and
in response to determining that the user does not have permission, rendering the second workspace page without the child block(s) of the first synced block.

19. The non-transitory computer-readable medium of claim 15, wherein, in response to receiving user input to insert the synced content in one or more additional workspace pages, creating an additional reference synced block for each of the additional workspace pages and adding a pointer that points to the first synced block to each of the additional reference synced blocks.

20. The non-transitory computer-readable medium of claim 19, wherein the first synced block and each reference synced block are each associated with a display that lists all the workspace pages on which the synced content appears.

21. The non-transitory computer-readable medium of claim 20, wherein in response to a user selecting a workspace page on a list, navigating the user to the selected workspace page.

22. The non-transitory computer-readable medium of claim 19, further comprising:
displaying a menu in association with each of the reference synced blocks that provides a user with an option to unsync the reference synced block; and
in response to receiving a user selection of the option, performing the following:
duplicating the child block(s) in the first synced block, and
replacing the reference synced block with the duplicated child block(s).

23. The non-transitory computer-readable medium of claim 19, further comprising:
displaying a menu in association with the first synced block that provides a user with an option to unsync all the reference synced blocks; and
in response to selecting the option, performing the following:
duplicating the child block(s) in the first synced block, and
replacing the first synced block and all the reference synced blocks with the duplicated child block(s).

24. The non-transitory computer-readable medium of claim 15, wherein the first synced block is created in response to a user adding a block of a synced block type.

25. The non-transitory computer-readable medium of claim 15, wherein creating the reference synced block comprises:
displaying a menu in association with the first synced block that includes a copy and sync option;
receiving a user selection of the copy and sync option;
receiving user input to paste the first synced block on the second workspace page at a paste location; and
creating the reference synced block at the paste location on the second workspace page.

26. The non-transitory computer-readable medium of claim 15, wherein creating the first synced block and the reference synced block comprises:
receiving user input to copy and paste one or more blocks from the first workspace page to the second workspace page at a paste location;
providing the user with a paste and sync option on the second workspace page; and
in response to the user selecting the paste and sync option, creating the first synced block on the first workspace page, adding the copied and pasted block(s) as child block(s) to the first synced block, and creating the reference synced block on the second workspace page at the paste location.

27. The non-transitory computer-readable medium of claim 15, wherein a synced block does not contain text, but is a container for one or more child blocks that each have their own attributes, and wherein a plurality of synced blocks are multiple instances of the same block at different locations.

* * * * *